R. P. JONES.
OIL TRAP.
APPLICATION FILED MAR. 19, 1921.

1,397,892.

Patented Nov. 22, 1921.

Inventor
Robert P. Jones
By Prentiss, Stone & Boyden
Attorneys

UNITED STATES PATENT OFFICE.

ROBERT P. JONES, OF PORT ARTHUR, TEXAS.

OIL-TRAP.

1,397,892.    Specification of Letters Patent.    Patented Nov. 22, 1921.

Application filed March 19, 1921. Serial No. 453,689.

*To all whom it may concern:*

Be it known that I, ROBERT P. JONES, a citizen of the United States, residing at Port Arthur, in the county of Jefferson and State of Texas, have invented certain new and useful Improvements in Oil-Traps, of which the following is a specification.

This invention relates to floating oil traps, booms and seines for catching floating oil or oil material on the surface of water.

One object of the invention is to provide an oil trap for catching oil floating on the surface of oil refinery discharge canals, streams, and on the surface of water wherever oily material is discharged and floats on the surface.

One feature of the invention provides for an impervious flexible and continuous wall mounted in conjunction with a series of elongated float members which are fastened together so as to permit lateral movement, but prevent relative rotary movement of the trap.

Another feature of the invention relates to the manner of securing the floating oil trap so as to permit vertical movement necessary with the rise and fall of the water and yet to maintain the efficiency of the trap.

Details of the present invention provide for the hinged connection of float members so as to permit lateral movement, but no relative rotary movement of the different float members. Other details of the present invention provide for the particular fastening means used to anchor the float means so as to position the trap so that it may rise and fall freely with the water, but not move from a fixed predetermined position. Such details are modifications of the invention set forth in my application Serial No. 453,688, in which the broad claims are presented.

The details of the invention include the use of my suitable pumping means for removing the oil caught within the confines of the trap.

Laws to prevent the pollution of streams have been passed by many States and these laws often include reference to pollution by oil. In the majority of instances, waste waters from plants handling oil, refineries and pumping stations have a substantial film of oil floating thereon. In many instances plants discharge material known as B S which is the bottom settling material from tanks or waste refinery material including the mixture of sulfuric acid and refuse oil known as acid sludge. The present invention is directed toward catching and saving these waste materials, and provides means for floating on the surface of water and anchored in a position to entrap the floating oil material, the position of the trap being such as to permit the current of water to wash the oil material to a centralized location from which it may be conveniently pumped away, the current of the steam passing beneath the under portion of the trap.

The above and other details and advantages of the invention will be described and claimed in the following specification and claims, and illustrated in the accompanying drawings, in which—

Figure 2:
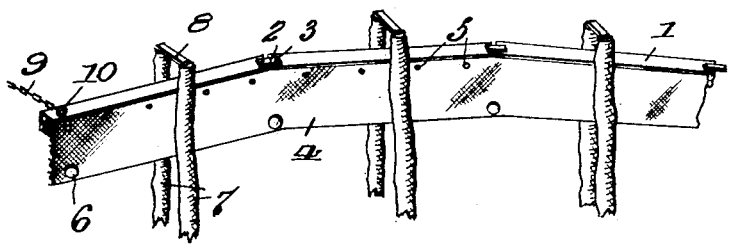
Fig. 2 is a perspective view illustrating the construction of several typical sections of the trap.

Referring in detail to the drawings, 1 indicates a float member forming a unit of a series of float members comprising the entire length of the trap. The float members 1 may be formed having dimensions 2"x4"x30", as mentioned in my application Serial No. 453,688, or they may have the size of one foot in thickness by twelve or fifteen feet in length, and be approximately square in cross section. Differences in dimensions of each float member may be varied according to the particular conditions of use. Adjacent ends of the float members are secured together by suitable hinges or plate members, so as to provide for relative lateral movement of the float members, but substantially no relative rotation of the members. One form of connecting device is shown in Fig. 2 as consisting of a broad metal plate 2 having its ends resting on the adjacent ends of float members 1 and secured thereto by pivot pins or spikes 3 driven vertically in the upper surface of the floats. A vertically extending curtain 4 of substantial cloth, such as canvas, or other flexible material, is secured to the floats 1 by suitable fastening means 5 and hangs downwardly for approximately eighteen inches, and extends substantially continuously the entire length of the floating portion of the trap. The invention provides that this curtain necessarily must cover the space between the adjacent ends of float members, so as to prevent the passage of oil between the ends of the floats. The downwardly extending portion of the curtain is provided with small weights 6 secured along its lower edge to maintain the curtain in its vertical position and resist the current of water and thereby assist in keeping the oil within the confines of the trap.

Securing means for maintaining the operative position of the trap is provided in part by a series of stakes or piles driven in the stream bed and positioned in pairs, one stake, post or pile of each pair being located in the vertical position at the sides of the floats and preferably midway of their length. The posts are indicated by the reference numerals 7 and are spaced apart by spacing means 8 which are illustrated by planks or boards extending between the posts 7 and secured to each. The floating members are thus enabled to move vertically with the rise and fall of the water which may be resultant of changes in tide, or rainfall. At the shore ends of the floats are chains or cables 9 secured to the floats by suitable means indicated by the eyelets 10. The shore end of the member 9 is secured at any suitable point which will permit the necessary vertical movement of the trap. In the preferred construction, the invention includes the use of an abutment located at either shore end of the trap as indicated at 11. The abutment 11 is preferably of masonry construction or concrete so as to make a tight fit with the floating portion of the trap and thereby prevent the escape of oil at the shore end of the trap. If piles are driven sufficiently close together, they might serve as this abutment. Preferably the stream side of the abutment is provided with a vertically extending slot or groove within which the adjacent end of the shore float member may move vertically as indicated at 12.

Figure 1:
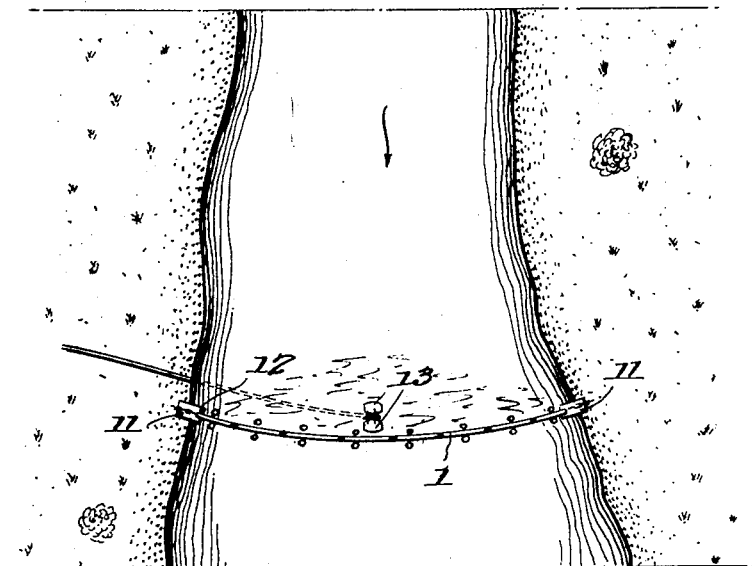
Figure 1 shows a top view of an oil trap embodying the features of the invention and located across a stream.
Figure 3:
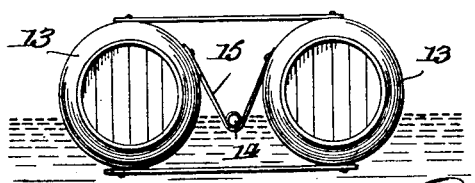
Fig. 3 is an enlarged end view illustrating the intake pipe and floats which may be used for removing oil from within the confines of the trap.

In Fig. 3 is illustrated an end view of a pipe used for removing the surface of oil from the upstream side of a trap as illustrated diagrammatically in Fig. 1. Two floats or casks 13 are positioned apart and rigidly secured by suitable braces. The intake pipe 14 is positioned horizontally and provided with a plurality of openings so that oil may be drawn into the pipe throughout the length thereof. The pipe 14 is suitably attached to the floats 13 by braces 15, the manner of mounting being such that the pipe 14 is at the level of the oil film. A flexible hose is connected to the pipe 14 and may extend to a vessel or the shore for attachment to suitable pumping means.

The floating oil trap described in my application Serial No. 453688 may be operated when constructed in accordance with the details of the present modifications providing for the hinged connections for the float members and the use of posts or piles for maintaining the position of the float.

I claim:

1. An oil trap comprising a plurality of elongated float members capable of floating on water and arranged end to end, connective hinge means secured to adjacent ends of said float members and permitting angular movement of said members with respect to each other and preventing relative rotation, and a flexible curtain connected to adjacent float members and extending therebetween and substantially vertically.

2. An oil trap comprising a plurality of elongated float members capable of floating on water and arranged end to end, connective hinge means secured to adjacent ends of said float members and permitting angular movement of said members with respect to each other and preventing relative rotation, a flexible curtain connected to adjacent float members and extending substantially vertically, and a weight secured to the lower edge of said curtain.

3. An oil trap comprising a plurality of float members capable of floating on water and arranged end to end, connective means secured to the ends of adjacent float members, a curtain connected with adjacent float members and extending substantially vertically, and means for securing said float members in any predetermined position comprising a pair of vertically positioned fixed posts spaced apart and one on either side of a float member so that the float member may move freely vertically between them.

4. An oil trap comprising a plurality of elongated float members capable of floating on water and arranged end to end, connective hinge means secured to adjacent ends of said float members and permitting angular lateral movement of said members with respect to each other, and preventing relative rotation, a flexible curtain connected to adjacent float members and extending substantially vertically, and means for securing said float members in any predetermined position comprising a pair of vertically positioned fixed posts spaced apart and one on either side of a float member so that the float member may move freely vertically between them.

5. An oil trap comprising a plurality of elongated float members capable of floating on water and arranged end to end, connective hinge means secured to adjacent ends of said float members and permitting angular lateral movement of said members with respect to each other and preventing relative rotation, a flexible curtain connected to adjacent float members and extending substantially vertically, a weight secured to the lower edge of said curtain, means for securing said float members in any predetermined position comprising a pair of vertically positioned fixed posts spaced apart and one on either side of a float member so that the float member may move freely vertically between them, and means connected to both posts of a pair to maintain them at a fixed distance apart.

6. An oil trap comprising a plurality of elongated float members capable of floating on water and arranged end to end, connective hinge means secured to adjacent ends of said float members and permitting angular movement of said members with respect to each other and preventing relative rotation, a curtain connected to adjacent float members and extending substantially vertically, means for securing said float members in any predetermined position comprising a pair of vertically positioned fixed posts spaced apart and one on either side of a float member so that the float member may move freely vertically between them, and fixed shore abutments coöperating with the end members of said plurality of floats and providing substantially oil tight connection between the movable float members and the fixed abutment.

In testimony whereof I affix my signature.

ROBERT P. JONES.